Nov. 8, 1932.  C. O. ROSS  1,887,169
WEIGHING SCALE
Filed Feb. 19, 1931  2 Sheets-Sheet 2
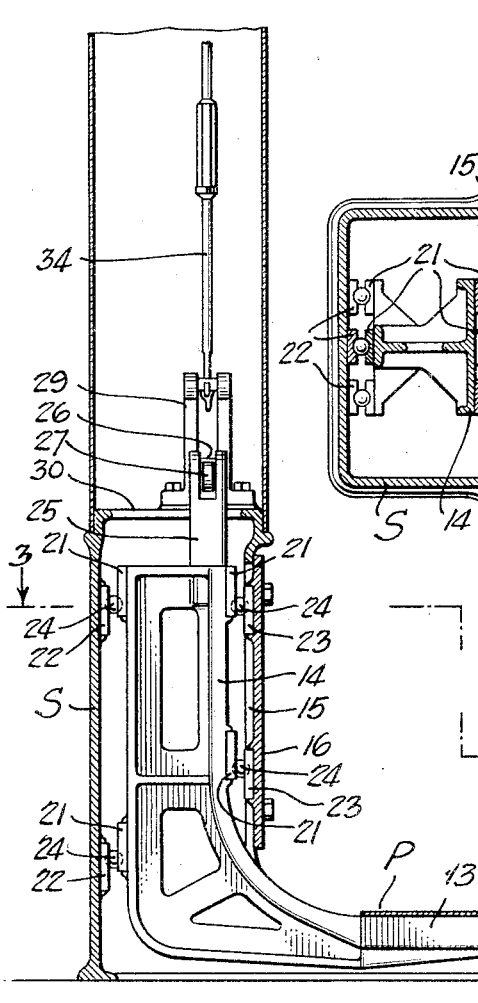
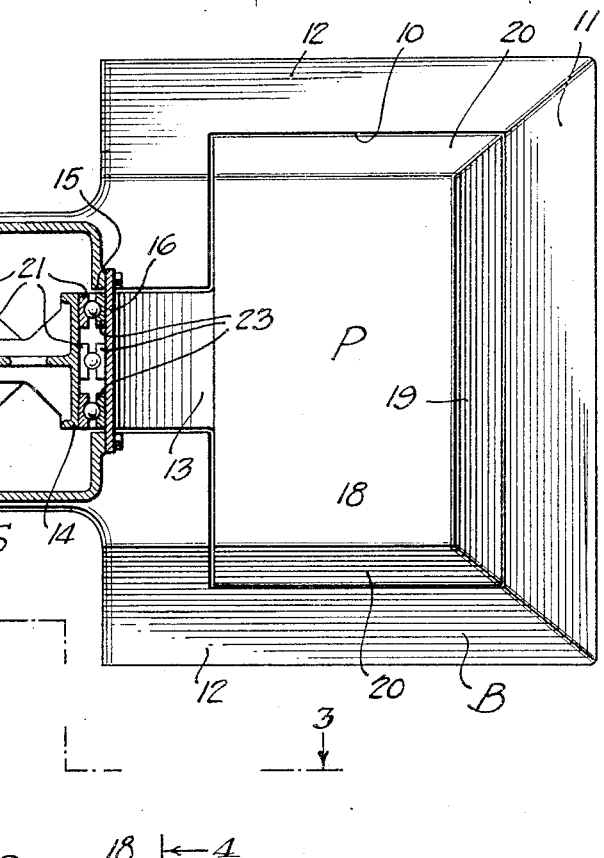
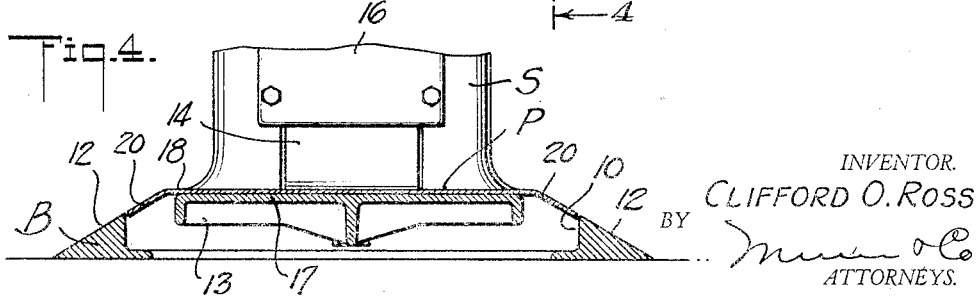
INVENTOR.
CLIFFORD O. ROSS
BY
ATTORNEYS.

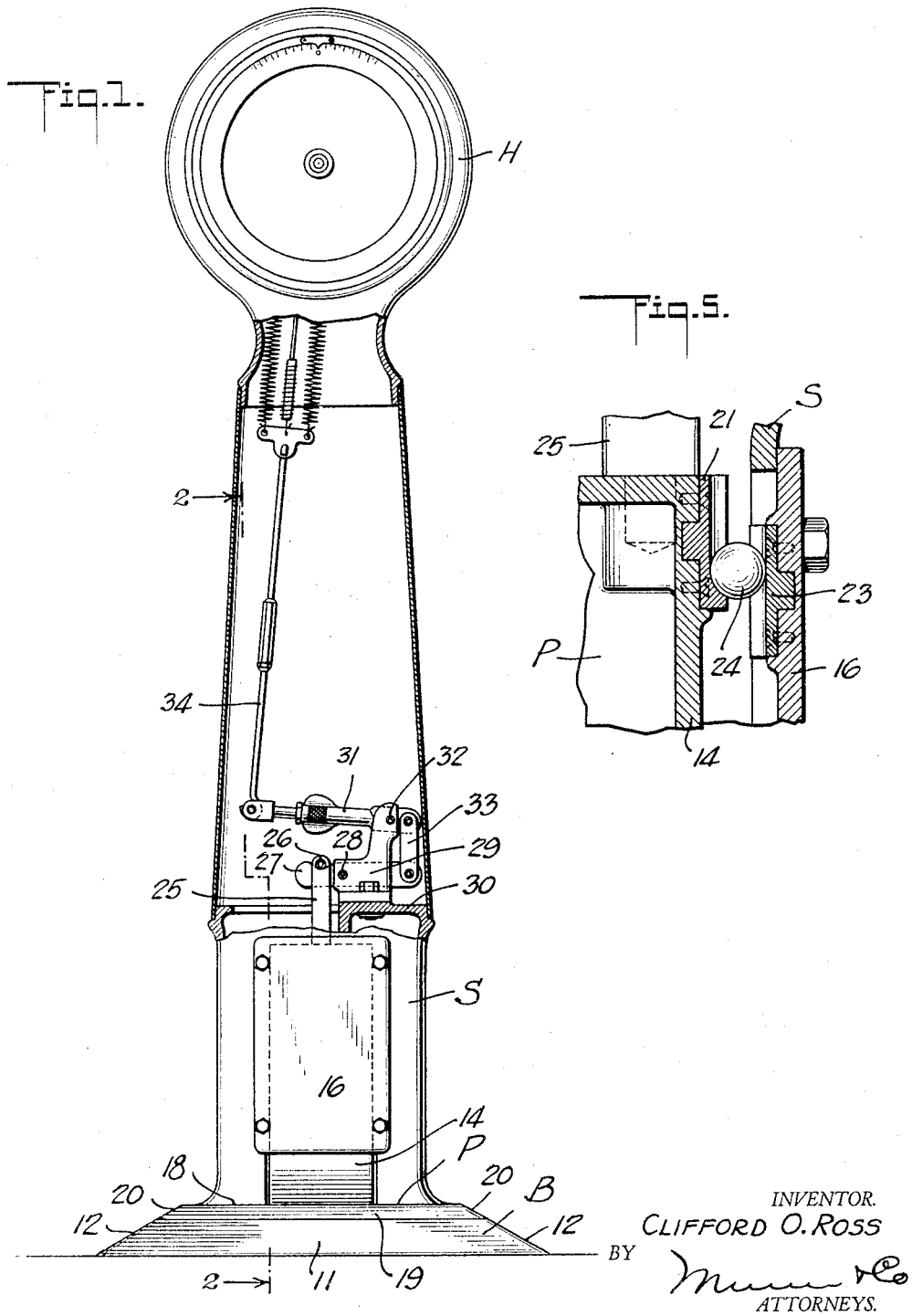

Patented Nov. 8, 1932

1,887,169

UNITED STATES PATENT OFFICE

CLIFFORD O. ROSS, OF LOS ANGELES, CALIFORNIA

WEIGHING SCALE

Application filed February 19, 1931. Serial No. 517,075.

My invention relates generally to weighing scales and more particularly to those of the type embodying a platform on which a person stands in order to be weighed.

It is a purpose of my invention to provide a weighing scale of this character wherein the projecting base portion and the platform of the scale are structurally characterized in such manner as to present no obstruction over which it would be likely for the passersby to trip or stumble, to the end of enabling the scale to be installed in many profitable locations from which scales as at present devised are barred due to the dangerous obstruction they constitute to the safety of the passersby.

It is a further purpose of my invention to provide a weighing scale by which the true weight of a person will be indicated irrespective of the location on the platform at which the person stands, all by the provision of mounting means for the platform whereby the latter is positively guided in its movements and with negligible friction.

It is another purpose of my invention to provide a weighing scale wherein the mechanism for multiplying and transferring movement of the platform to the indicating mechanism is removed from beneath the platform to enable the latter to be constructed relatively low in height.

I will describe only one form of weighing scale embodying my invention, and will then point out the novel features thereof in claims.

In the accompanying drawings:

Figure 1 is a view showing in front elevation, partly broken away, one form of weighing scale embodying my invention.

Figure 2 is an enlarged fragmentary vertical sectional view taken on the line 2—2 of Figure 1 and looking in the direction of the arrows.

Figure 3 is a horizontal sectional view taken on the line 3—3 of Figure 2 and looking in the direction of the arrows.

Figure 4 is a vertical sectional view taken on the line 4—4 of Figure 2 and looking in the direction of the arrows, and, Figure 5 is an enlarged detail sectional view of one of a number of anti-friction devices embodied in the platform mounting means of my invention.

Referring specifically to the drawings in which similar reference characters designate similar parts in each of the several views, my invention in its present embodiment comprises a base B of rectangular outline in plan, from which rises a hollow standard S supporting a head or casing H containing the indicating mechanism of the scale which forms no part of my present invention and may be of any conventional construction.

The base B in the present instance is provided with a rectangular opening or pocket 10 from which the front and side walls 11 and 12 respectively, of the base, slope or incline to the marginal edge of the base so as to be disposed at relatively acute angles with respect to the floor or other surface on which the base rests when the scale is installed, all as clearly shown in Figures 1, 2, and 4.

A platform on which a person is adapted to stand in order to be weighed is designated generally at P, and this platform is of substantially L shape to provide a horizontal portion 13 and a vertical portion 14, the latter portion extending into the standard S through a slot 15 in the latter closed by a removable cover plate 16.

The vertical portion 13 is mounted in the standard S in a manner to be later described, to support the platform for movement vertically, and the horizontal portion 14 of the platform includes a flat pad 17 disposed within the opening 10 and having secured thereon a foot plate 18 provided with front and side walls 19 and 20 respectively, which slope or incline to the marginal edge of the plate at the same angles as the corresponding walls of the base so as to form continuations of the latter walls when the platform is unloaded as shown in the drawings.

As the foot plate 18 fits within the opening 10 so as to leave but slight clearance, and as the platform is relatively low in height due to the elimination of all mechanism beneath the platform, the front and side walls of the base and platform will co-act to present to feet of the passersby acuted angled ramps or approaches rising from the floor to the top surface of the platform, over which it is extremely unlikely that a person would trip or stumble, to the end that the scale can be installed against a wall in a passageway without fear of causing injury to the passersby.

The vertical portion 14 of the platform is provided along its front and rear sides with races 21, whereas other races 22 and 23 are secured respectively to the rear wall of the standard S and to the inner side of the cover plate 16. Balls 24 are interposed between and work in the races for co-action therewith in mounting the platform for vertical movement while positively guiding the platform against any tilting movements, all with but negligible friction, to the end that regardless of the location on the foot plate 18 at which a person stands to be weighed, the vertical movement of the platform will remain accurate to insure the true weight of the person.

Rising from the upper end of the vertical portion of the platform is a post 25 with which is pivotally associated at 26 a lever 27 pivoted intermediate its ends at 28 on a bracket 29 secured on a partition 30 in the standard S. A second lever 31 is pivoted adjacent one end at 32 on an upright extension of the bracket 29, and connecting the levers 27 and 29 is a link 33. To the free end of the lever 29 is pivotally connected the usual spring mounted draw rod 34 operatively connecting the platform with the indicating mechanism of the scale through the medium of the above described lever system which ordinarily is located beneath the platform and multiplies the vertical movement of the latter as will be understood.

It will be manifest from the foregoing description that I have provided a weighing scale, the base portion and platform of which are of simple and compact construction and structurally characterized and correlated in a manner to preclude injury to passersby coming in contact with these parts of the scale, and that furthermore the manner in which the platform is mounted insures accurate vertical movement of the platform when depressed by the weight of a person standing on the platform at any possible location.

Although I have herein shown and described only one form of weighing scale embodying my invention, it is to be understood that various changes and modifications may be made therein without departing from the spirit of the invention and the spirit and scope of the appended claims.

I claim:

1. A weighing scale having a base, and a platform on the base, the base and platform having sloping sides, with the sides of the platform forming continuations of the sides of the base when the platform is unloaded and co-acting to define inclined approaches to the top of the platform extending at a relatively acute angle from and with respect to a surface on which the base is supported.

2. A weighing scale having a base provided with an opening and side walls sloping downwardly and outwardly from the marginal edges of the opening, and a platform mounted for vertical movement in the opening, and having side walls sloping outwardly and downwardly to form continuations of the respective side walls of the base when the platform is unloaded.

3. A weighing scale having a base, a weighing platform on the base, and means on the base and platform co-acting to provide inclined approaches to the top of the platform extending at a relatively acute angle from and with respect to a floor or other surface on which the base is rested.

4. A weighing scale having a weighing platform, and means co-acting with the platform to define inclined approaches to the top of the latter, extending at a relatively acute angle from and with respect to a floor or similar surface on which the scale is supported.

5. A weighing scale having a base, a hollow standard rising from the base, a platform having a horizontal portion correlated with the base and a vertical portion extending into the standard, and means co-acting with the vertical portion of the platform to mount the platform for rectilinear movement vertically.

6. A weighing scale having a base, a hollow standard rising from the base, the base projecting laterally from the standard and having an opening and the front wall of the standard having a slot extending into the opening, a platform having a horizontal portion disposed in said opening and a vertical portion insertable through said slot into the standard, a closure for the slot, and means co-acting with the vertical portion of the platform to mount the platform for vertical movement.

7. A weighing scale having a base, a hollow standard rising from the base, the base having an opening and the front wall of the standard having a slot extending into the opening, a platform having a horizontal portion disposed in said opening and a vertical portion insertable through said slot into the standard, a closure for the slot, and antifriction means on the standard, vertical portion of the platform and closure, co-acting to mount the platform for vertical movement.

8. A weighing scale having a base, a platform correlated with the base, the scale being characterized by the absence of mechanism beneath the platform to enable the latter to be disposed at a relatively low height from a floor or other surface on which the base is supported, means for mounting the platform for movement vertically, and means correlated with the platform to define inclined approaches to the top of the latter, extending at a relatively acute angle with respect to the surface on which the base is supported.

9. A weighing scale having a base, a platform correlated with the base, the scale being characterized by the absence of mechanism beneath the platform to enable the latter to be disposed at a relatively low height from a floor or other surface on which the base is supported, means for mounting the platform for movement vertically, and sloping sides on the base and platform forming continuations of each other when the platform is unloaded, and providing inclined approaches to the top of the platform, extending at a relatively acute angle from and with respect to the surface on which the base is supported.

10. A weighing scale having a base; a platform; means for mounting the platform for movement vertically; mechanism for transferring vertical movement of the platform to an indicator, said mechanism being disposed at a location other than beneath the platform, so as to enable the latter to be at a relatively low height from a surface on which the base is suported; and means defining inclined approaches to the top of the platform, extending at a relatively acute angle from and with respect to the surface on which the base is supported.

11. A weighing scale having a base; a platform; means for mounting the platform for movement vertically; mechanism for transferring vertical movement of the platform to an indicator, said mechanism being disposed at a location other than beneath the platform so as to enable the latter to be at a relatively low height from a surface on which the base is supported; the base and platform having sloping sides forming continuations of each other when the platform is unloaded, to provide inclined approaches to the top surface of the platform, extending at a relatively acute angle from and with respect to the surface on which the base is supported.

CLIFFORD O. ROSS.